(12) United States Patent
Moskovich et al.

(10) Patent No.: US 6,441,931 B1
(45) Date of Patent: *Aug. 27, 2002

(54) METHOD AND APPARATUS FOR MONITORING A DEDICATED COMMUNICATIONS MEDIUM IN A SWITCHED DATA NETWORK

(75) Inventors: Reuven Moskovich, Tel Aviv; Yuval Shvirsky, Holon, both of (IL); Bill Hawe, Pepperell, MA (US)

(73) Assignee: Nortel Networks Limited, St. Laurent (CA)

( * ) Notice: Subject to any disclaimer, the term of this patent is extended or adjusted under 35 U.S.C. 154(b) by 0 days.

This patent is subject to a terminal disclaimer.

(21) Appl. No.: 09/108,113

(22) Filed: Jun. 30, 1998

Related U.S. Application Data (63) Continuation-in-part of application No. 08/722,609, filed on Sep. 27, 1996, now Pat. No. 5,898,837.
(60) Provisional application No. 60/012,038, filed on Feb. 23, 1996.

(51) Int. Cl.[7] .............................................. H04B 10/08
(52) U.S. Cl. ..................................................... 359/110
(58) Field of Search ................................ 359/110, 161, 359/135; 395/200; 709/224; 350/96

(56) References Cited

U.S. PATENT DOCUMENTS

| | | | |
|---|---|---|---|
| 4,270,214 A | 5/1981 | Davis et al. ................... 455/80 |
| 4,406,513 A * | 9/1983 | Raphael ........................ 350/96 |
| 4,965,795 A | 10/1990 | Coffelt et al. ................. 370/244 |
| 5,182,554 A | 1/1993 | Kaiser et al. ................. 340/826 |
| 5,226,120 A | 7/1993 | Brown et al. ................. 709/224 |
| 5,239,535 A | 8/1993 | Borm et al. .................. 370/249 |
| 5,274,631 A | 12/1993 | Bhardwaj .................... 370/401 |
| 5,287,506 A | 2/1994 | Whiteside ..................... 714/39 |
| 5,317,198 A * | 5/1994 | Husbands ................... 307/116 |
| 5,432,907 A | 7/1995 | Picazo, Jr. et al. .......... 709/249 |
| 5,489,896 A | 2/1996 | Sofer et al. .................. 370/445 |
| 5,537,098 A | 7/1996 | Patrick et al. ............... 370/452 |
| 5,563,930 A | 10/1996 | Pester, III .................... 379/34 |
| 5,574,722 A | 11/1996 | Slykhouse et al. .......... 370/257 |
| 5,610,905 A | 3/1997 | Murthy et al. ............... 370/401 |
| 5,644,617 A | 7/1997 | Schmidt .......................... 379/5 |
| 5,680,397 A | 10/1997 | Christensen et al. ........ 370/421 |
| 5,696,701 A | 12/1997 | Burgess et al. ............... 714/25 |
| 5,710,777 A | 1/1998 | Gawne ........................ 714/717 |
| 5,715,293 A | 2/1998 | Mahoney ..................... 379/23 |
| 5,898,837 A | 4/1999 | Guttman et al. ............ 709/224 |
| 6,025,654 A * | 2/2000 | Roppel et al. ................. 307/10 |
| 6,047,321 A | 4/2000 | Raab et al. .................. 709/224 |

* cited by examiner

Primary Examiner—Leslie Pascal
(74) Attorney, Agent, or Firm—Blakely Sokoloff Taylor & Zafman LLP

(57) ABSTRACT

A method and apparatus for monitoring the performance of a dedicated communications medium in a switched data networking environment wherein a probe having a bypass circuit allows promiscuous monitoring of all traffic between a switch and a network device, such as a file server, in either direction, and in full duplex mode. Additionally, the bypass circuit eliminates the requirement for a separate repeater between the switch and the network device.

26 Claims, 6 Drawing Sheets

METHOD AND APPARATUS FOR MONITORING A DEDICATED COMMUNICATIONS MEDIUM IN A SWITCHED DATA NETWORK

This patent application claims the benefit and is a continuation-in-part of U.S. non-provisional patent application Ser. No. 08/722,609, filed Sep. 27, 1996, now U.S. Pat. No. 5,898,837 which claims the benefit of U.S. Provisional Application No. 60/012,038, filed Feb. 23, 1996.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever.

BACKGROUND OF THE INVENTION

1. Field of the Invention

The present invention is related to the field of computer networking. Specifically, the present invention is related to a method and apparatus for monitoring a dedicated communications medium in a switched data networking environment.

2. Background of the Invention

Figure 1:
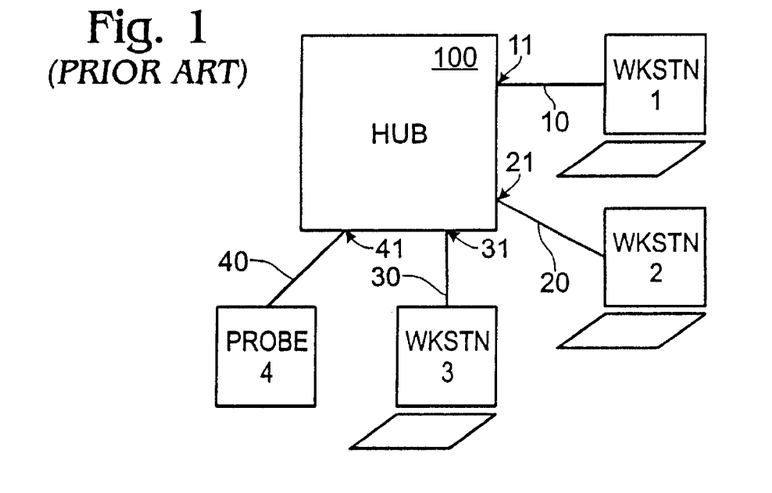
FIG. 1 is an illustration of a data network utilizing a shared communications media hub.

With reference to FIG. 1, prior art data networks generally utilized one or more shared media hubs, e.g., hub 100. Multiple end user workstations, e.g., workstations 1, 2 and 3, were coupled to a shared communications medium (mediums 10, 20 and 30, respectively) that was, in turn, coupled to a port on the shared media hub. The hub 100 had multiple ports (e.g., ports 11, 21, 31), each coupled to a different shared communications medium. High end workstations stations, or servers, such as file servers or print servers, were also coupled via a dedicated or shared communications medium to a port on the shared media hub.

As the applications running on these data networks became more mission critical, and bandwidth utilization of the shared communications media increased, it became advantageous to monitor, for example, the performance and the error rates of data traffic on the shared communications media to facilitate proper operation of the data network. To accomplish this monitoring, network monitoring devices were configured into shared media hubs, or coupled to the port (41) of a shared media hub via a communications medium (40) as stand-alone devices (e.g., probe 4). In either configuration, the monitoring devices were typically referred to as probes. The probes would promiscuously monitor the data traffic on all shared communications media in the network and look at, for example, performance and error statistics, data traffic patterns and typical data flows across the shared communications media.

Figure 2:
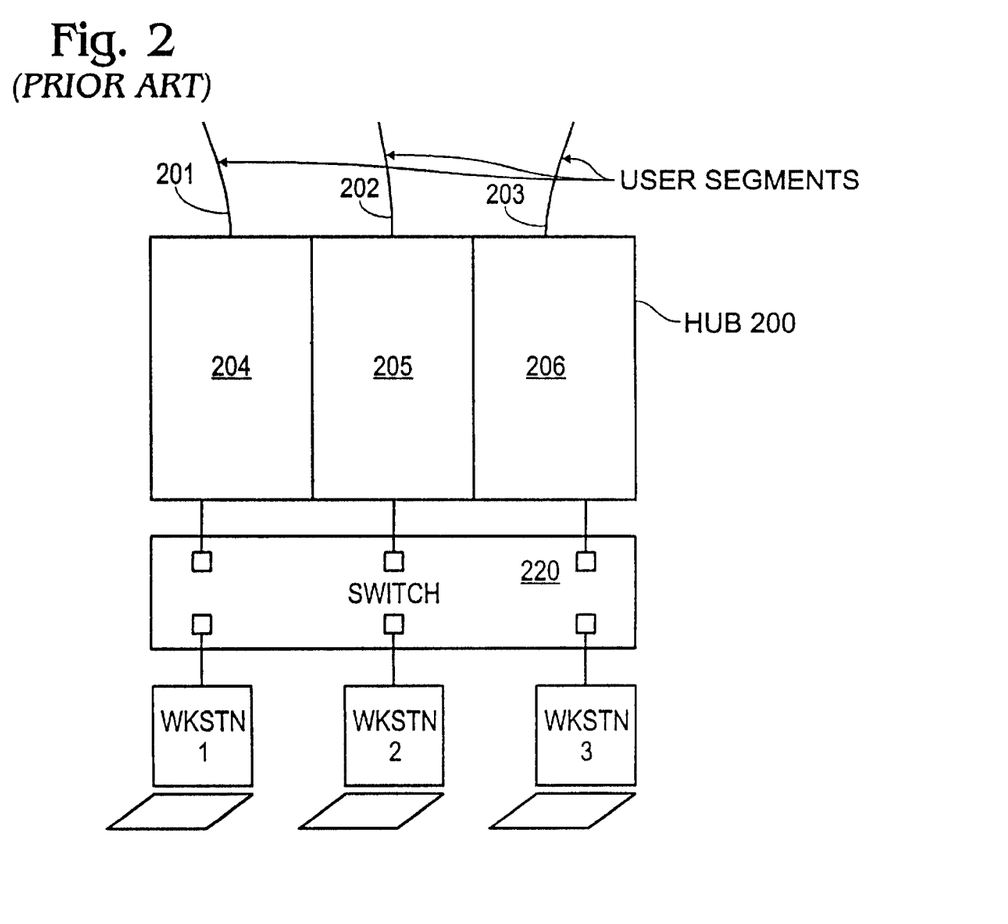
FIG. 2 is an illustration of a data network utilizing a switching hub (switch) to provide a dedicated communications medium to a network device.

As shown in FIG. 2, as performance requirements of prior art data networks continued to increase, and additional performance intensive applications were employed, the shared communications media coupled to the shared media hubs were typically divided into multiple network segments (e.g., network segments 201, 202 and 203) to reduce data traffic on each segment, although all network segments were still in the same collision domain, i.e., the network segments were not electrically isolated. Data communication between these segments generally utilized well known backbone, rather than switching, technology.

As performance requirements continued to increase to meet traffic demands, switches such as switch 220 illustrated in FIG. 2 were used to segment the network into multiple collision domains. Segmenting the network into multiple collision domains so that a data packet from one segment (e.g., segment 201) did not traverse the network to another segment (e.g., segment 202) unless the data packet was destined to a particular device on another segment as determined by, for example, a destination address specified in the data packet.

Figure 3:
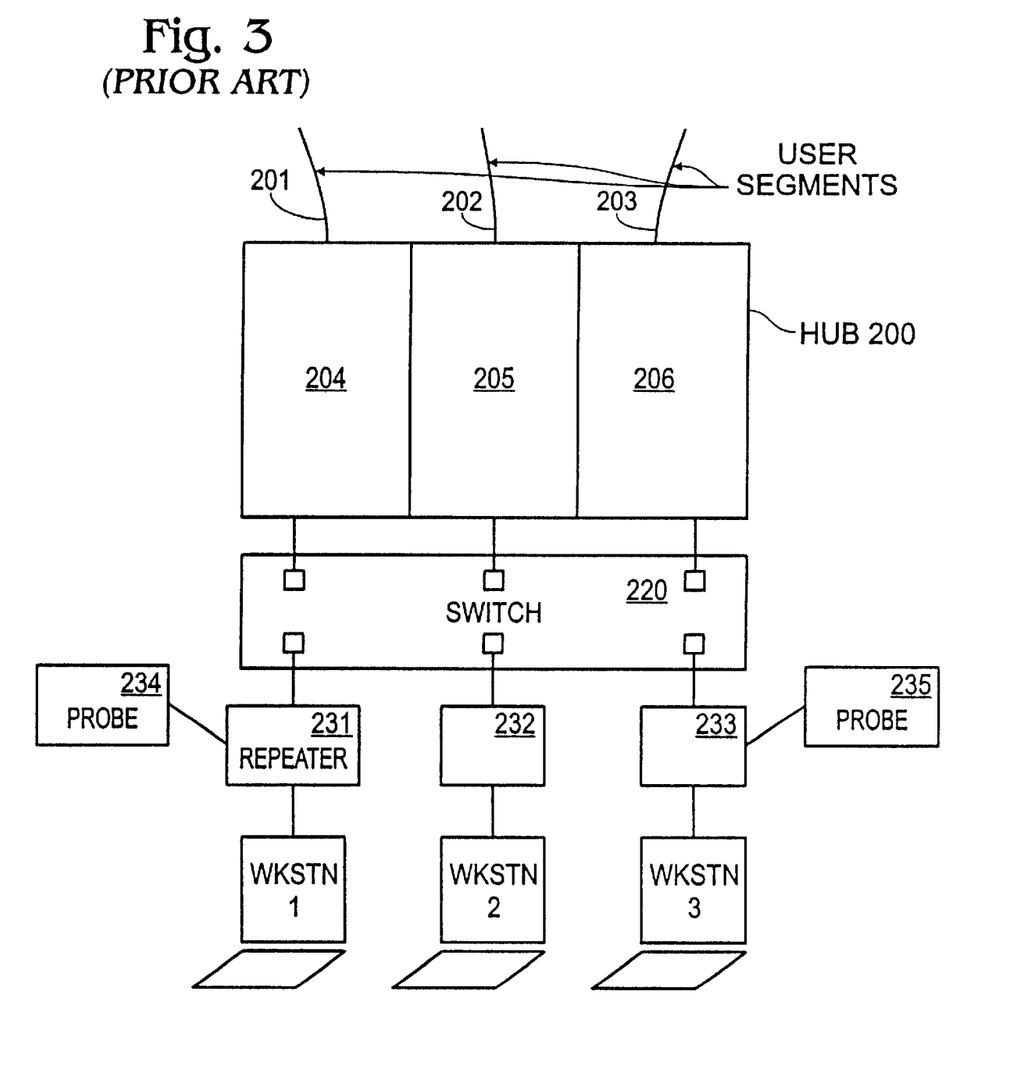
FIG. 3 is an illustration of a prior art method of monitoring performance in a data network utilizing a repeater coupled to each network device.

The problem, however, in monitoring network performance in such an environment utilizing probes was that a single probe was required for each segment in order to promiscuously monitor the data traffic on that segment. With reference to FIG. 3, as the data networks became highly segmented, it became evident that it was impractical to attach a probe to each segment in the network to promiscuously monitor all traffic. Rather, network administrators tended to concentrate probing activities to highly concentrated server farms or segments in the network where the traffic was the busiest, for example, a segment from a switch to a file server. These file servers were typically coupled via a dedicated communications medium to a port on a switch to provide, for example, a data communications rate of 10 megabits or 100 megabits per second, or even 1000 megabits per second, to the file server. Connecting the file server using a dedicated communications medium to the switch 220 formed a single station network segment. In a single station network segment, it was impossible to attach a probe to that segment to promiscuously monitor all network traffic because only a single port was necessarily available to which the segment is coupled to the switch. To overcome this limitation, a multiport repeater was inserted between the switch and the file server, e.g., repeater 233 between workstation 3 and switch 220 in FIG. 3, thereby providing additional ports (on the inserted multiport repeater) to facilitate connection of a probe (e.g., probe 235) into the segment.

Although switch 220 in FIG. 3 shows only six ports for purposes of illustration, it is understood that a switch may have sufficient ports to support, for example, ten or twenty servers. In such a situation, it becomes impractical to attach a repeater between every server and switch port to promiscuously monitor data traffic, due to the increased cost, space, and asset management responsibilities encountered as a result of the additional equipment. In addition, for each communications medium that was to be monitored, that network segment would have to be taken down, the server disconnected from the switch, the repeater inserted into the communications medium, and the server communication reestablished. This process would be highly disrupting to data communications in the network. Moreover, in attempting to diagnose a performance problem, one would be required to shut down the network segment, insert a repeater, and couple a probe to the repeater in order to collect monitoring data. By the time the probe was operable, the performance problem may well have disappeared.

BRIEF SUMMARY OF THE INVENTION

A method and apparatus for monitoring performance in a switched network environment is disclosed. An embodiment of the present invention is coupled between a switch and a network device, for example, a file server, to provide a promiscuous tap into the communications medium between the switch and the network device. The apparatus promiscuously monitors all packets between the switch and the network device without the need for a separate repeater, yielding significant economic savings and eliminating the downtime as may occur in the prior art when performing troubleshooting operations.

A bypass circuit associated with the probe allows promiscuous monitoring of all traffic between the switch and the network device in either direction, and in full duplex mode. Additionally, the bypass circuit eliminates the requirement for a separate repeater between the switch and the network device. Moreover, the bypass circuit is fault tolerant, i.e., if power is disrupted to the probe or if the probe malfunctions, the bypass circuit allows traffic to continue to pass between the switch and the network device—data traffic is not disrupted in any manner as a result of failure or malfunction of the monitoring aspect of the probe.

BRIEF DESCRIPTION OF THE SEVERAL VIEWS OF THE DRAWINGS

The present invention is illustrated by way of example and not limitation in the figures of the accompanying drawings, in which like references indicate similar elements and in which.

DETAILED DESCRIPTION OF THE INVENTION

The present invention is a method and apparatus for monitoring the performance of a dedicated communications medium in a switched data networking environment. In the following description, numerous specific details are set forth in order to provide a thorough understanding of the present invention. It will be apparent, however, to one of ordinary skill in the art that the present invention may be practiced without these specific details. In other instances, well-known architectures, circuits, and techniques have not been shown to avoid unnecessarily obscuring the present invention.

In alternative embodiments, the present invention may be applicable to implementations of the invention in integrated circuits or chip sets, wireless implementations, switching systems products and transmission systems products. For purposes of this application, the terms switching systems products shall be taken to mean private branch exchanges (PBXs), central office switching systems that interconnect subscribers, toll/tandem switching systems for interconnecting trunks between switching centers, and broadband core switches found at the center of a service provider's network that may be fed by broadband edge switches or access multiplexors, and associated signaling, and support systems and services. The term transmission systems products shall be taken to mean products used by service providers to provide interconnection between their subscribers and their networks such as loop systems, and which provide multiplexing, aggregation and transport between a service provider's switching systems across the wide area, and associated signaling and support systems and services.

Figure 4:
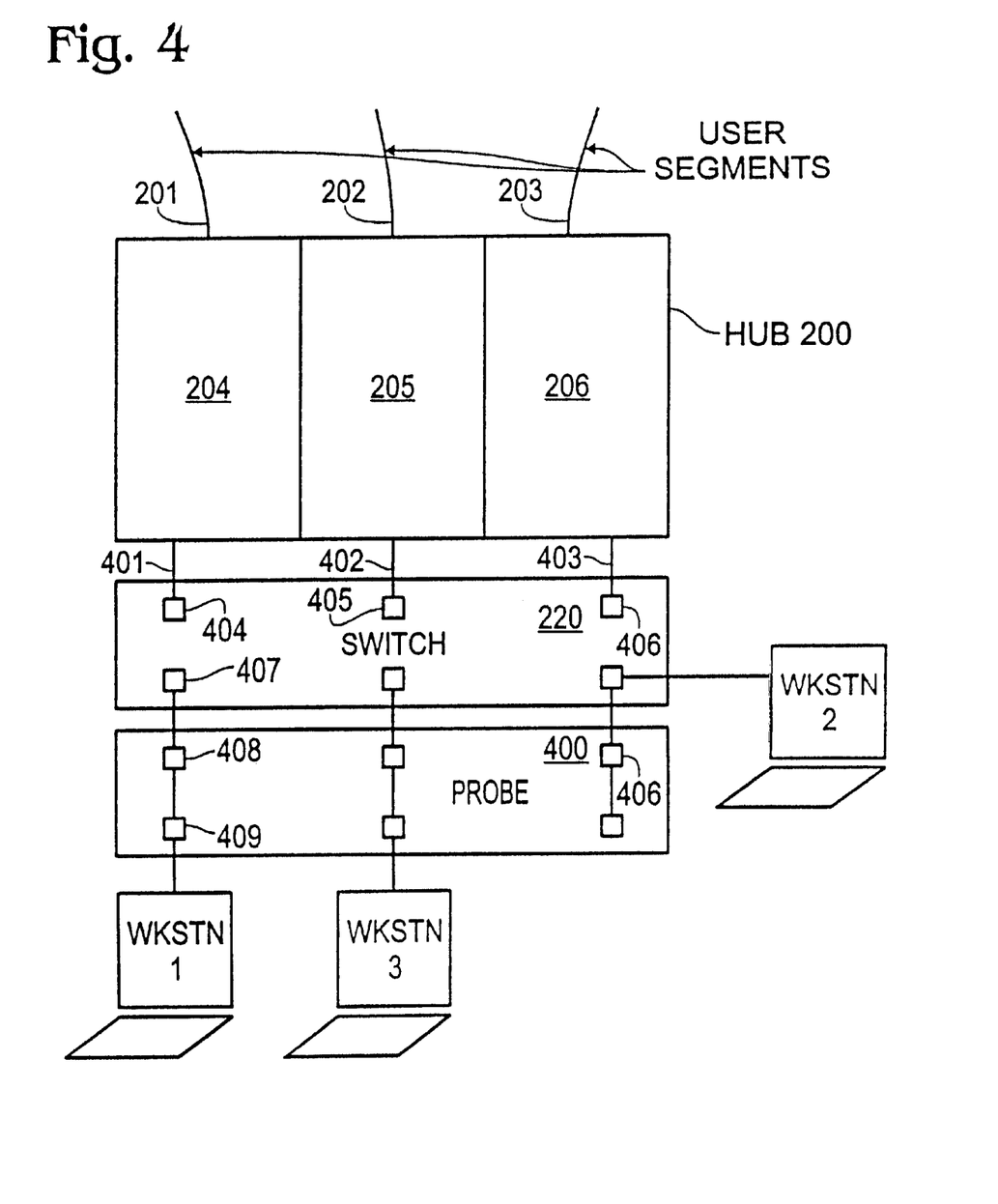
FIG. 4 is an illustration of an embodiment of the present invention.

With reference to FIG. 4, an embodiment of the present invention as may be utilized in a typical switched data networking environment is illustrated. Multiple network segments 201, 202 and 203 are coupled to a shared media hub 200. Each segment is connected to separate modules 204, 205 and 206, respectively, within the hub. Each of the hub modules are coupled via a dedicated communications medium 401, 402 and 403 to an individual port 404, 405 and 406 on a switch 220. Ports on the switch are additionally shown connected either to a dedicated network device, e.g., device 2 (perhaps an end user workstation or a server), or connected to an embodiment of the present invention, i.e., a probe 400. More specifically, a port (e.g., port 407) on the switch may be connected to a port (e.g., port 408) on the probe. Another port (409) on the probe, in turn, is coupled to a network device such as device 1. Probe 400 includes circuitry for repeating data packets between the switch and the network devices coupled to the probe.

The probe 400 utilizes internal bypass circuitry in promiscuously monitoring the communications medium coupling network devices 1 and 3 to the probe. The probe promiscuously monitors all traffic between the hub 200 and switch 220 destined for or received from either network device 1 or network device 3. All data traffic is captured and subsequently saved, e.g., for some form of analysis or statistical compilation. The probe analyzes those packets according to, for example, the remote monitoring standards RMON I or II. These standards promulgate, for example, specific statistical characteristics, such as user history, performance and error rates and traffic patterns between different workstations on the network across all layers of the International Standards Organization (ISO) Open Systems Interconnection (OSI) seven layer networking model.

An embodiment of the bypass circuit as may be utilized in the probe 400 of FIG. 4 is now described with reference to FIG. 5. A probe 400 is shown (in dotted lines) coupled between a switching hub 200 and a network device 1 (i.e., data terminating equipment—DTE) via a transmit/receive pair of lines, e.g., conventional unshielded twisted pair wiring operating in full duplex. The transmit/receive pair is coupled from the probe to the switch at port 407 and the DTE at port 408 by way of, for example, standard RJ45 connectors. The output of the switch is transmitted out the transmit port (TX) 407b over the transmit line and passes through a relay 412 in the probe to the receive port (RX) 408b of the DTE (network device). The other line in the full duplex link is coupled between the transmit port (TX) 408a of the DTE and the receive port (RX) 407a of the switching hub 220. This line passes through relay 414 in the probe. Within the probe, relay 412 is connected to repeater 416, while relay 414 is connected to repeater 418. Each of repeaters 416 and 418 are further coupled to a monitoring device 410 that monitors the individual lines of the twisted pair.

Figure 5:
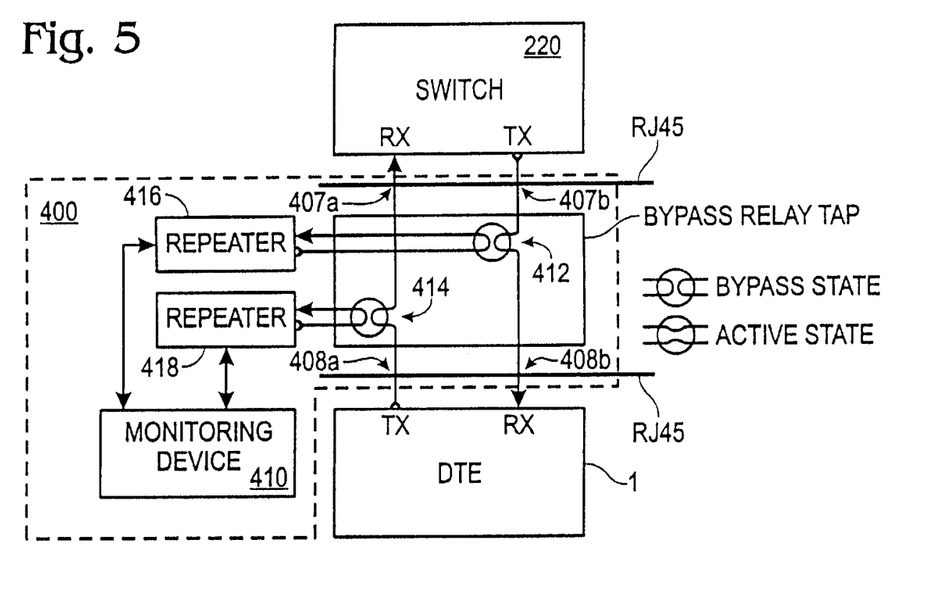
FIG. 5 illustrates an embodiment of the bypass circuit as may be utilized by the probe of FIG. 4.

In the embodiment illustrated in FIG. 5, relays 412 and 414 can both be enabled (in the active state) so that data packets passing through the relays are transmitted to the monitoring device 410 via repeaters 416 and 418, respectively, as the data packets are transmitted between the DTE and the switching hub. The probe is in monitor mode when the relays are active. If, for example, power fails, the relays are in the bypass position (as indicated in the illustration), thus allowing transfer of the data frames to continue between the switching hub and network device (DTE) in the event of loss of power to the probe. In this situation the relays are inactive and the probe is in bypass mode. Thus, only when the relays are active do data packets on both lines of the twisted pair pass through the repeaters to be repeated to the monitoring equipment before continuing through the probe coupled between the switching hub and DTE. It is envisioned that this embodiment could be coupled to multiple ports by using different relay arrangements to provide for full duplex operations.

A second embodiment of the bypass circuit as may be utilized in the probe 400 of FIG. 4 is now described with reference to FIG. 6. A probe 400 is shown (in dotted lines) coupled between a switching hub 200 and a network device 1 (i.e., data terminating equipment—DTE) via a transmit/receive pair of lines, e.g., conventional unshielded twisted pair wiring operating in full duplex. The transmit/receive pair is coupled from the probe to the switch at port 407 and the DTE at port 408 by way of, for example, standard RJ45 connectors. The output of the switch is transmitted out the transmit port (TX) 407*a* over the transmit line and passes through a high impedance passive tap 422 in the probe to the receive port (RX) 408*a* of the DTE (network device). The other line in the full duplex link is coupled between the transmit port (TX) 408*b* of the DTE and the receive port (RX) 407*b* of the switching hub 220. This line passes through a high impedance passive tap 424 in the probe. Within the probe, tap 424 is connected to amplifier 428, while tap 422 is connected to amplifier 426. Each of amplifiers 426 and 428 are further coupled to a monitoring device 410 that monitors the individual lines of the twisted pair.

Figure 6:
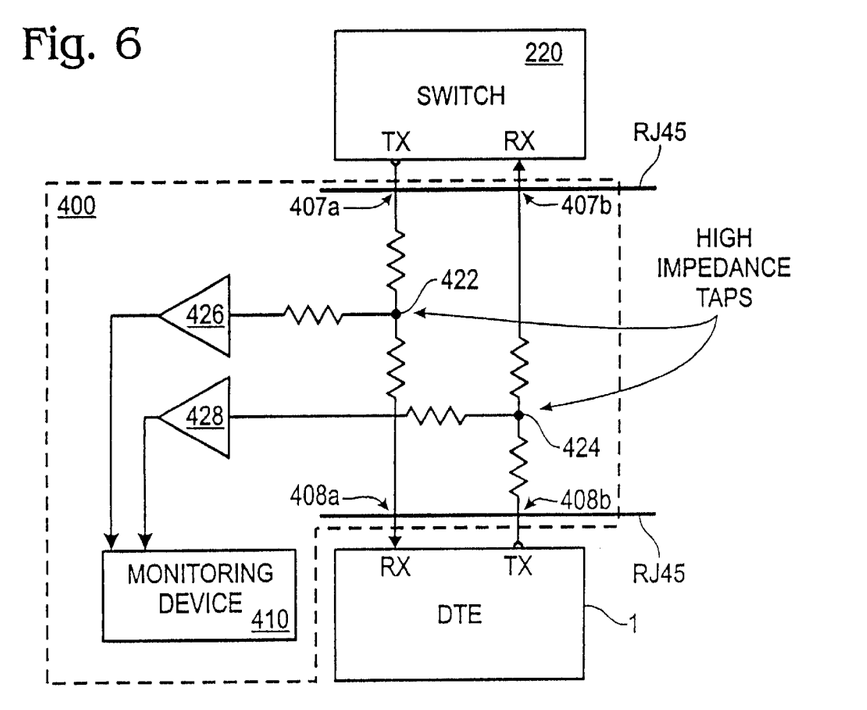
FIG. 6 illustrates another embodiment of the bypass circuit as may be utilized by the probe of FIG. 4.

In the embodiment illustrated in FIG. 6, taps 422 and 424 are configured so that data packets passing through the taps can be transmitted to the monitoring device 410 via amplifiers 426 and 428, respectively, as the data packets are transmitted between the DTE and the switching hub. The probe is in monitor mode when the power is present at the amplifiers. If, for example, power fails, the amplifiers fail to provide sufficient signal strength to the monitor such that the taps/amplifiers are in the bypass position. The taps, however, do not prevent the transfer of the data frames to continue between the switching hub and network device (DTE) in the event of loss of power to the probe. Thus, only when the amplifiers are active do data packets on both lines of the twisted pair pass through the taps and amplifiers to the monitoring equipment as the packets are passing through the probe coupled between the switching hub and DTE.

Taps 422 and 424 are very high impedance taps that load the line very lightly so as not to affect the normal operation of the line. Amplifiers 426 and 428 increase the level of the signal amplitude lost due to the passive taps to levels appropriate for the monitoring device. In this way, if the amplifiers are powered down or power to the probe is lost, there will be no effect to the transmission path between the switching hub and the network device (DTE), i.e., the probe will continue to forward data directly through the probe in bypass mode, rather than forward data through the monitor as when in monitor mode. An advantage to the high impedance taps is that a repeater is not required in each line. This embodiment, therefore, can be more easily scaled to larger data networking architectures. Another advantage is the passive tap is more reliable than an electromechanical relay.

It is also well understood by those of ordinary skill in the art that the embodiment illustrated in FIG. 6 could be modified to include a multiplexor on the active amplifiers so that it could work in a full duplex environment.

Figure 7:
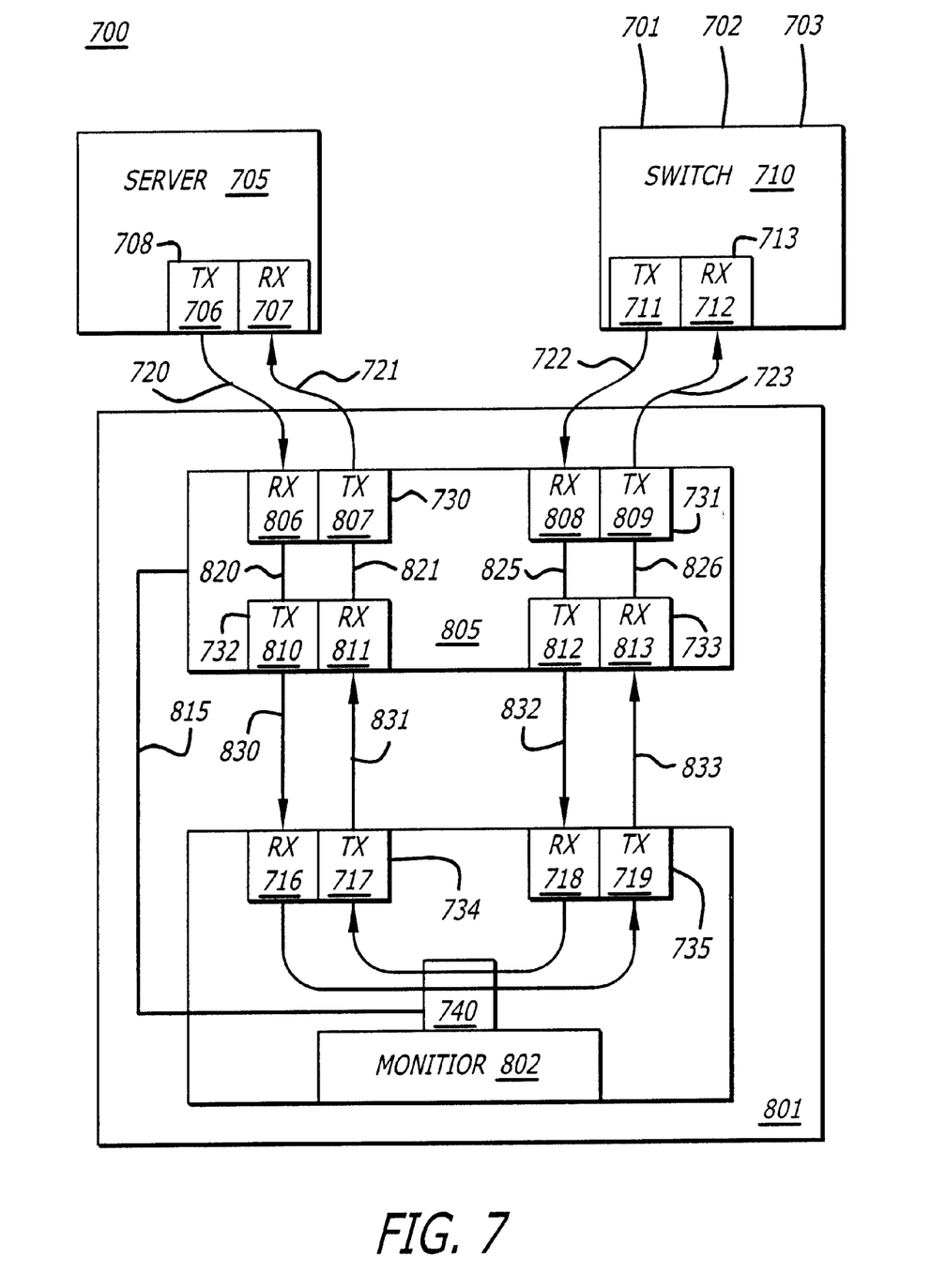
FIG. 7 is a block diagram of an embodiment of the present invention.

With reference to FIG. 7, another embodiment of the present invention as may be utilized in a typical switched data networking environment 700 is illustrated. The illustrated data network 700 utilizes fiber optic communications media to support, for example, a fast Ethernet Local Area Network (LAN), gigabit Ethernet LAN or fiber distributed data interface (FDDI) switched data networking enviromnent. (The term fast Ethernet LAN, or simply fast Ethernet, as used herein shall apply to LANs adhering to the Carrier Sense, Multiple Access with Collision Detection (CSMA/CD) standard, generally operating at a signaling rate of 100 Mb/s over various media types and transmitting Ethernet formatted or Institute of Electrical and Electronic Engineers (IEEE) standard 802.3 formatted data packets, while the term gigabit Ethernet LAN, or simply gigabit Ethernet, as used herein shall apply to LANs adhering to the Carrier Sense, Multiple Access with Collision Detection (CSMA/CD) standard, generally operating at a signaling rate of 1000 Mb/s over various media types and transmitting Ethernet formatted or Institute of Electrical and Electronic Engineers (IEEE) standard 802.3 formatted data packets). The two network segments illustrated, e.g., between the server and the probe, and the switch and the probe, are each defined by a pair of fiber optic communications medium, 720/721, and 722/723. Depending on the network configuration, e.g.,. FDDI, fast Ethernet or gigabit Ethernet, each fiber optic pair may operate in either half duplex or full duplex mode.

Multiple network segments 701, 702 and 703 are coupled to a switch 710. Port 713 of the switch is additionally shown connected to an embodiment of the present invention, i.e., a probe 801, via fiber optic media pair 722/723. More specifically, port 713 of the switch may be connected to a port 731 on a fiber optic bypass circuit 805 coupled to the probe 801. Another port, port 733, is connected to a port 735 of the probe. Yet another port on the probe, i.e., port 734, is coupled to port 732 of the fiber optic bypass circuit, which, in turn, is coupled via port 730 of the bypass circuit to a network device, such as server 705, via fiber optic communications media pair 720/721. Probe 801 includes circuitry 740 for repeating data packets between the switch 710 and the server 705.

Figure 8:
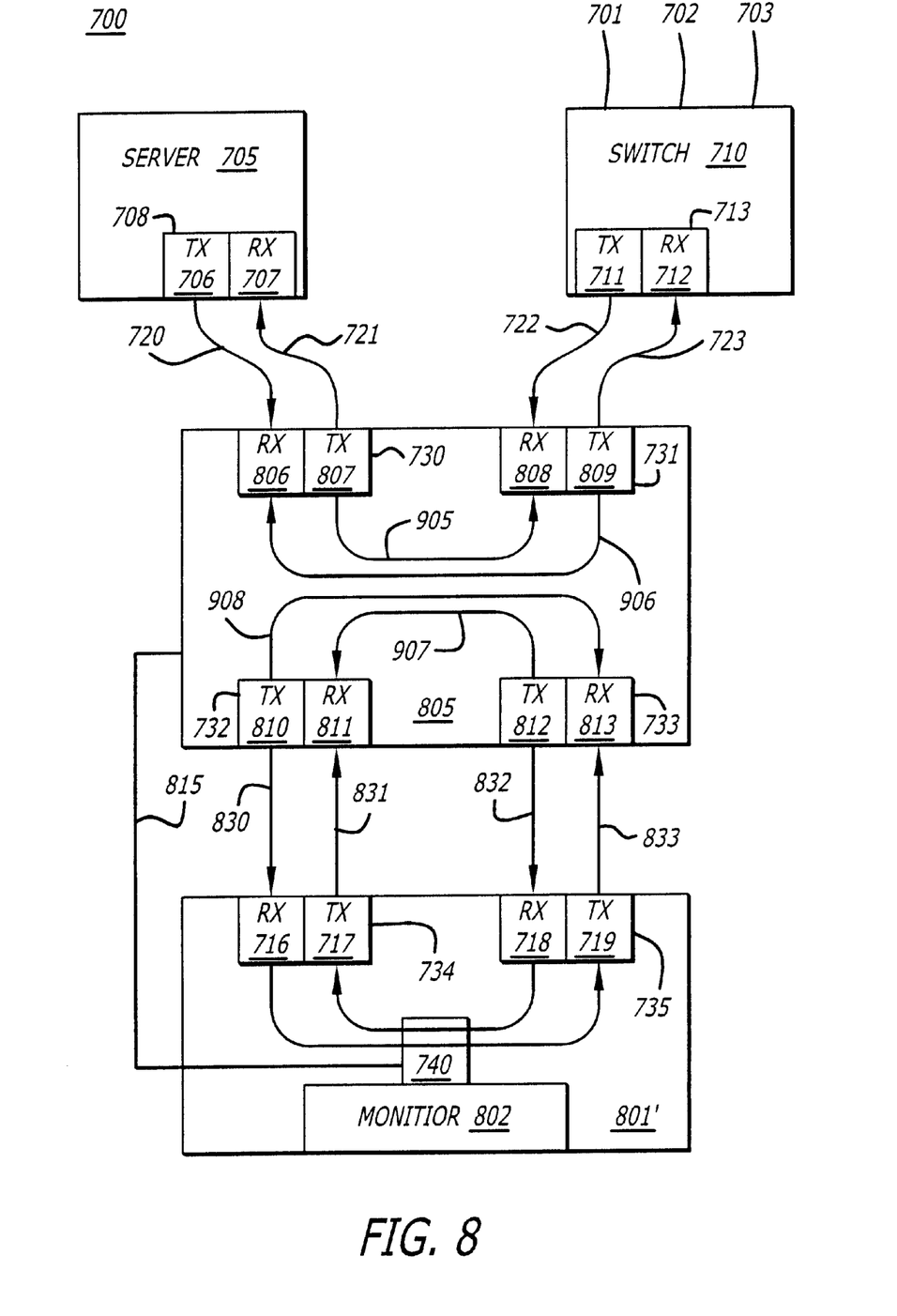
FIG. 8 is a block diagram of an embodiment of the present invention.

While the embodiment illustrated in FIG. 7 shows the fiber optic bypass circuit 805 as being part of probe 801, it is well understood by those of ordinary skill in the art that the fiber optic bypass circuit 805 can also be externally associated with the probe 801, as shown in FIG. 8. Furthermore, the fiber optic bypass circuit 805 may comprise a standard FDDI dual bypass switch such as the type that allows a dual-attach station to be bypassed without loss of ring integrity, or full duplex communication, as the case may be. The fiber optic bypass circuit 805 contains, for example, two reversing fiber optic bypass switches that direct optical signals to the appropriate fiber according to signals received over bypass circuit control line 815.

The probes 801 and 801' utilizes the bypass circuitry, whether internal to the probe or external to and 801 the probe, in promiscuously monitoring the communications medium coupling network devices 705 and 710 to the probe. The probe promiscuously monitors all traffic between the server 705 and switch 710, in either or both directions, as appropriate. All data traffic is captured and subsequently saved, e.g., for some form of analysis or statistical compilation. The probe analyzes those packets according to, for example, the remote monitoring standards RMON I or II as discussed above.

The probe 801 is shown coupled between the switching hub 710 and the server network device 705 via two transmit/receive pair of lines, e.g., conventional single mode or multimode fiber optic lines 722 and 723, and 720 and 721, operating as separate pairs in full duplex. One transmit/receive pair is coupled to port 731 of the fiber optic bypass circuit associated with the probe and port 713 of the switch. The other transmit/receive pair is coupled to port 730 of the fiber optic bypass circuit associated with the probe and port 708 of the server. The bypass circuit, in turn, provides for communication with ports 734 and 735 of the probe via its ports 732 and 733. For example, port 733 of the bypass circuit is coupled to port 735 of the probe via transmit/receive pair 832/833, and port 732 of the bypass circuit is coupled to port 734 of the probe via transmit/receive pair 830/831.

The output of the switch is transmitted out the transmit port (TX) 711 over the transmit line 722, received at receive port (RX) 808 of the bypass circuit and passes through to transmit port (TX) 812 of the bypass circuit, where the output is then transmitted via transmit line 832 to receive port 718 of the probe. Similarly, the data received at the probe is passed through the repeater 740 in the probe to transmit port 717, where it is transmitted out the transmit port over transmit line 831 to receive port 811 of the bypass circuit. The data then passes through the bypass circuit to transmit port 807 of the bypass circuit, where the output is then transmitted via transmit line 721 to receive port 707 of the server 705. For full duplex communication between the switch and the server, the other communications path in the full duplex link is defined by the communications media coupled between the transmit port (TX) 706 of the server and receive port 806 of the bypass circuit, receive port 716 of the probe and transmit port 719 of the probe, and receive port 813 of the bypass circuit receive port 712 of the switch. Both communication paths, from the switch to the server, and from the server to the switch, pass through repeater 740 in the probe. Within the probe, monitor 802 is connected to repeater 740. Although not illustrated in such detail in FIGS. 7 and 8, the repeater 740 is actually two repeaters, one for each direction of data communication flow-from the server to the switch and from the switch to the server. Each of repeaters are further coupled to the monitoring device 802 that monitors the individual lines of communication passing through the probe.

In the embodiment illustrated in FIG. 7, the repeater 740 can be enabled (in the active state) so that data packets passing through the repeater are transmitted to the monitoring device 802, as the data packets are transmitted between the server and the switching hub. The probe is in monitor mode when the repeater is active. If, for example, power fails to the probe, or the repeater malfunctions, etc.,a signal is transmitted from the probe over bypass circuit control line 815 to the fiber optic bypass circuit, causing the fiber optic bypass circuit to switch to the bypass position, as indicated in the block diagram in FIG. 8, wherein ports 731 and 730 "wrap" such that communcations-received from switch 710 via port 731 of the bypass circuit are forwarded directly to port 730 of the bypass circuit, and then on to the server, and vise versa, thus allowing transfer of the data frames to continue between the switching hub and the server in the event of loss of power to the probe as illustrated by paths 905 and 906. In this situation the repeater is inactive and the probe is in bypass mode as illustrated by paths 907 and 908. Thus, only when the repeater is active do data packets on both lines of the fiber optic communications media pass through the repeater to be repeated to the monitoring equipment before continuing through the probe coupled between the switching hub and the server. It is envisioned that this embodiment could be coupled to multiple ports by using different repeater arrangements to provide for full duplex operations.

It should be noted that there are, of course, many possible alternatives to the described embodiments which are within the understanding of one of ordinary skill in the relevant art. The present invention, therefore, is to be limited only by the claims as set forth below.

What is claimed is:

1. A probe that monitors communications between a first and a second fiber optic communications medium, comprising:
   a first port coupled in communication with the first fiber optic communications medium;
   a second port coupled in communication with the second fiber optic communications medium;
   a monitor through which the communications are passed to monitor the communications forwarded from the first port to the second port; and
   an optical bypass circuit that bypasses the monitor and directly forwards the communications from the first fiber optic communications medium to the second fiber optic communications medium when power fails to the probe.

2. The probe of claim 1, wherein the optical bypass circuit is coupled in communication between the first fiber optic communications medium and the first port and between the second fiber optic communications medium and the second port to bypass the first and second ports and directly forward communications from the first fiber optic communications medium to the second fiber optic communications medium when power fails to the probe.

3. The probe of claim 2, wherein the optical bypass circuit is a dual bypass switch.

4. The probe of claim 3, wherein the first and second fiber optic communications mediums operate according to fiber distributed data interface (FDDI) protocol.

5. The probe of claim 3, wherein the first and second fiber optic communications mediums transmit communications as Ethernet formatted data packets in accordance with a carrier sense, multiple access with collision detection (CSMA/CD) protocol at a signaling rate of 100 megabits per second.

6. The probe of claim 3, wherein the first and second fiber optic communications mediums transmit communications as Ethernet formatted data packets in accordance with a carrier sense, multiple access with collision detection (CSMA/CD) protocol at a signaling rate of 1000 megabits per second.

7. A probe that monitors communications between a first network device and a second network device, comprising:
   a first port coupled in communication with the first network device;
   a second port coupled in communication with the second network device;
   a fiber optic bypass circuit that couples the first port to the second port to forward communications received from the first network device via the first port to the second network device via the second port; and
   a monitor coupled to the fiber optic bypass circuit that receives communications from the fiber optic bypass circuit when power is applied to the probe so as to monitor the communications forwarded from the first port to the second port.

8. The probe of claim 1, further comprising:
   a first and second repeater coupled between the first port and the second port, the first repeater to receive the communications from the first port, pass them to the monitor and transmit them to the second port.

9. The probe of claim 1, further comprising:

a tap coupled between the first port and the second port, the tap to tap the communications between the first port and the second port and pass it to the monitor.

10. The probe of claim 1, wherein the monitor monitors the communications between the first port and the second port to determine performance, error statistics, data traffic patterns and typical data flows.

11. The probe of claim 1, wherein the optical bypass circuit is fault tolerant.

12. The probe of claim 7, wherein the fiber optic bypass circuit is coupled in communication between the first network device and the first port and between the second network device and the second port to bypass the first and second ports and directly forward communications from the first network device to the second network device when power fails to the probe.

13. The probe of claim 7, wherein the fiber optic bypass circuit is a dual bypass switch.

14. The probe of claim 7, wherein the communication between the first port and the first network device and the second port and the second network device is in accordance with the fiber distributed data interface (FDDI) protocol.

15. The probe of claim 7, further comprising:

a repeater coupled between the first port and the second port, the repeater to receive communications from the first port, pass them to the monitor and transmit them to the second port.

16. The probe of claim 7, further comprising:

a tap coupled between the first port and the second port, the tap to tap the communications between the first port and the second port and pass it to the monitor.

17. The probe of claim 7, wherein the monitor monitors the communications between the first port and the second port to determine performance, error statistics, data traffic patterns and typical data flows.

18. The probe of claim 7, wherein the fiber optic bypass circuit is fault tolerant.

19. A method to monitor communication performance in a switched network between a first fiber optic communications medium and a second fiber optic communications medium, the method comprising:

providing a probe having a monitor and an optical bypass circuit between a first network device and a second network device;

monitoring the communication between the first network device and the second network device with the monitor to determine performance, error statistics, data traffic patterns and typical data flows; and bypassing the monitoring with the optical bypass circuit and providing communication directly between the first network device and the second network device when the probe experiences a failure.

20. The method of claim 19, wherein the failure of the probe is a power failure.

21. The method of claim 19, wherein the failure of the probe is an operational failure.

22. The method of claim 19, further comprising:

prior to monitoring, tapping the communication between the first network device and the second network device to pass it to the monitor.

23. The method of claim 19, further comprising:

prior to monitoring, repeating the communication between the first network device and the second network device.

24. The method of claim 19, wherein the optical bypass circuit is a dual bypass switch.

25. The method of claim 19, wherein the communication between the first network device and the second network device is in accordance with the fiber distributed data interface (FDDI) protocol.

26. The method of claim 19, wherein the optical bypass circuit is fault tolerant.

* * * * *